(12) United States Patent
Kawasaki et al.

(10) Patent No.: US 8,508,705 B2
(45) Date of Patent: Aug. 13, 2013

(54) IN-PLANE SWITCHING MODE ACTIVE MATRIX LIQUID CRYSTAL DISPLAY UNIT

(75) Inventors: Taku Kawasaki, Kanagawa (JP); Teruaki Suzuki, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 698 days.

(21) Appl. No.: 12/492,642

(22) Filed: Jun. 26, 2009

(65) Prior Publication Data
US 2009/0323003 A1 Dec. 31, 2009

(30) Foreign Application Priority Data
Jun. 26, 2008 (JP) .................................. 2008-167185

(51) Int. Cl.
*G02F 1/1343* (2006.01)
*G02F 1/1333* (2006.01)

(52) U.S. Cl.
USPC .......................................... 349/141; 349/138

(58) Field of Classification Search
USPC ................................. 349/141, 138
See application file for complete search history.

(56) References Cited

U.S. PATENT DOCUMENTS

| | | | |
|---|---|---|---|
| 2003/0043329 A1* | 3/2003 | Park | 349/141 |
| 2004/0061817 A1* | 4/2004 | Maeda | 349/113 |
| 2004/0066480 A1* | 4/2004 | Yoshida et al. | 349/123 |
| 2006/0146258 A1* | 7/2006 | Chen et al. | 349/141 |
| 2006/0164584 A1* | 7/2006 | Park et al. | 349/141 |

FOREIGN PATENT DOCUMENTS

| | | |
|---|---|---|
| JP | 2001-242442 | 9/2001 |
| JP | 2002-040400 | 2/2002 |

OTHER PUBLICATIONS

Japanese Office Action dated Nov. 21, 2012 in corresponding Japanese Patent Application No. 2008-167185 with English translation of Japanese Office Action.

* cited by examiner

*Primary Examiner* — Michael Caley
(74) *Attorney, Agent, or Firm* — Young & Thompson

(57) ABSTRACT

In order to improve the light transmissivity above the transparent comb-teeth electrodes provided in an in-plane switching mode active matrix liquid crystal display unit, the liquid crystal gaps above the transparent comb-teeth electrodes are made larger than the liquid crystal gaps between the transparent comb-teeth electrodes.

13 Claims, 8 Drawing Sheets

IN-PLANE SWITCHING MODE ACTIVE MATRIX LIQUID CRYSTAL DISPLAY UNIT

BACKGROUND OF THE INVENTION

1. Field of the Invention

The present invention relates generally to a liquid crystal display unit, and more specifically to an in-plane switching mode active matrix liquid crystal display unit.

2. Description of Related Art

It is known in the art that there is an in-plane switching (IPS) mode liquid crystal display (LCD) unit in which the axes of the orientated liquid crystal molecule are rendered rotatable in a plane substantially parallel with the substrates forming part of the display unit. With such an in-plane switching mode, a TFT (Thin Film Transistor) substrate, which is arranged in parallel with a color filter substrate, carries thereon common electrodes and pixel electrodes. Image display is implemented using the electronic field components substantially in parallel with the substrates, which electric field components are generated by applying electric potential to the common and pixel electrodes. The in-plane switching mode liquid crystal display unit has round advantages that a wide view angle is obtained and the contrast of a displayed image is improved.

A liquid crystal display unit is as is well known in the art, provided with a first substrate (viz., TFT substrate) and a second substrate (viz., color filter substrate). These two substrates are positioned in parallel with each other in an opposing manner and hold a liquid crystal layer therebetween. The first substrate carries thereon scan lines, common lines in parallel with the scan lines, data lines provided such as to extend crosswise to the scan lines, and active electronic elements (viz., TFTs) provided nearby the intersections of the data lines and the scan lines. The second substrate is provided with a color filter, a deflector plate, etc.

With the in-plane switching mode, in order to rotate the axes of orientated liquid crystal molecules in a plane substantially parallel with the substrates, two kinds of transparent comb-teeth electrodes are patterned on the first substrate such that the comb-teeth electrodes of the two different comb electrodes are alternatively positioned and connected respectively to the common electrodes and the pixel electrodes. A liquid crystal display unit using the in-plane switching mode is disclosed in, by way of example, Japanese Laid-open Patent Application No. 2000-352713 (first prior art).

The conventional in-plane switching mode display unit has encountered the difficulty that it is not easy to sufficiently rotate the liquid crystals above the comb-teeth electrodes because the lateral electric fields thereabove are poor. Furthermore, the liquid crystal molecules are liable to rise up above the comb-teeth electrodes due to the electric fields normal to the substrate, resulting in the fact that an effective retardation is reduced. Accordingly, even if the comb-teeth electrodes are made of a transparent material, the light transmissivity (viz., light transmission ratio) above the comb-teeth electrodes does not reach the transmissivity at the area between the comb-teeth electrodes, and thus it is difficult to achieve a high level of panel transmissivity.

Second prior art (viz., Japanese Laid-open Patent Application No. 2003-75850) discloses an IPS mode active matrix LCD unit, which is provided with uneven or rugged portions in a pixel's light transmitting area in order to vary liquid crystal gaps thereby to improve liquid crystal response. However, the comb-teeth electrodes of the second prior art are not transparent and thus the liquid crystals above the comb-teeth electrodes provides no contribution to the increment of light transmissivity. Further, even if the comb-teeth electrodes are made of transparent material, since there exists no special intension of increasing the liquid crystal gaps above the comb-teeth electrodes, it is not possible to increase the light transmissivity above the comb-teeth electrodes.

Third prior art (viz., Japanese Laid-open Patent Application No. 2003-215620) is concerned with a technology of forming a concaved portion(s) between the teeth electrodes so as to provide different crystal gaps within each pixel area. This prior art increases the liquid crystal gaps between the comb teeth electrodes in order to make it easy to rotate liquid crystals between the comb-teeth electrodes with the result of improving response time of halftone display images. Therefore, there is no need to increase the number of comb-teeth electrodes merely for the purpose of response time improvement, and accordingly, it is possible to prevent undesirable aperture ratio decrease resulting from the increase in the number of comb-teeth electrodes. In other words, the third prior art is able to increase aperture ratio by reducing the number of comb-teeth electrodes without adversely affecting the response speed. However, the third prior art has encountered a difficulty that it is not possible to improve the light transmissivity without decreasing the number of comb-teeth electrodes. In the case where the number of comb-teeth electrodes is small, it is not practically acceptable to further reduce the number of comb-teeth electrodes. This is because the reduction of the number of comb-teeth electrodes widens the interval between the adjacent, comb-teeth electrodes, leading to the difficulty that the liquid crystal drive potential is undesirably increased.

Fourth prior art (viz., Japanese Laid-open Patent Application No. 2008-225337) discloses an active matrix liquid crystal display unit wherein an upper substrate is provided with a plurality of slanted surfaces on the liquid crystal layer side. The fourth prior art describes that a high aperture ratio can be obtained with the provision of the aforesaid slanted surfaces. However, the fourth prior art fails to provide any suggestion of improving the rotation of the liquid crystal molecules above the transparent electrodes provided in each pixel area.

SUMMARY OF THE INVENTION

It is therefore an object of the present invention to provide all in-plane switching mode active matrix liquid crystal display unit in which liquid crystal gaps above comb-teeth transparent electrodes are made larger then those between the comb-teeth transparent electrodes in order to improve light transmission rate above the electrodes.

According to one aspect of the present invention, an in-plane switching mode active matrix liquid crystal display unit comprises a first substrate, a second substrate provided in parallel with the first substrate, and a liquid crystal layer held between the first and second substrates. The first substrate includes a plurality of scan lines, a plurality of common lines provided in parallel with the scan lines, a plurality of data lines provided such as to cross the scan lines, and active elements near the cross portions of the data lines and the scan lines, the first substrate further comprises a plurality of transparent comb-teeth electrodes for applying electric fields to the liquid crystal layer. With such an arrangement, the present invention is characterized in that crystal gaps above the transparent comb-teeth electrodes are made larger than liquid crystal gaps between the transparent comb-teeth electrodes.

BRIEF DESCRIPTION OF THE DRAWINGS

The features and advantages of the present invention will become more clearly appreciated from the following description taken in conjunction with the accompanying drawings in which like elements or portions are denoted by like reference numerals and in which.

PREFERRED EMBODIMENTS

Figure 1:
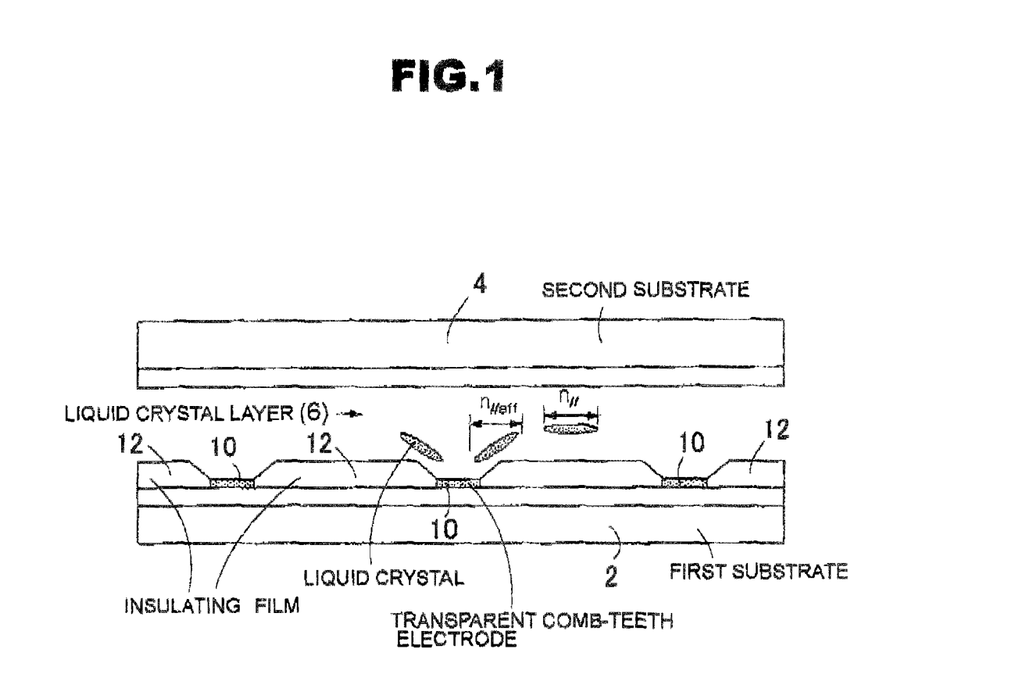
FIG. 1 is a vertical cross section schematically illustrating part of the liquid crystal display unit according to an embodiment of the present invention.

FIG. 1 is a cross sectional view schematically illustrating an embodiment of the present invention. The embodiment comprises a first substrate (TFT substrate) 2, a second substrate (color-filter substrate) 4, a liquid crystal layer 6 sandwiched between the first substrate 2 and the ID second substrate 4, and a plurality of transparent comb-teeth electrodes 10, all of which form, part of a liquid crystal display unit. The transparent comb-teeth electrodes 10 extend in a direction normal to the instant figure. Lateral electric fields (viz., in-plane electric fields) are generated between the adjacent comb-teeth electrodes 10. The liquid crystal display unit to which is the present invention is applicable is well known in the art, and thus the details thereof will be omitted for brevity.

According to the embodiment shown in FIG. 1, insulating films (e.g. organic films) 12 are provided (viz., patterned) on the first substrate 2 and between the transparent comb-teeth electrodes 10. Therefore, the liquid crystal gaps above the transparent comb-teeth electrodes 10 become larger that those between the transparent comb-teeth electrodes 10, and as such, the rotations of the liquid crystals above the comb-teeth electrodes 10 are rendered easier. Further, since the liquid crystals rise up in the vicinity of the comb-teeth electrodes, the refractive index (n///) in the longitudinal direction of the liquid crystal becomes effectively $n//_{eff}$ and thus, the refractive index anisotropy Δn provided by liquid crystals becomes smaller. However, the decrease of the retardation Δn·d ("d" denotes a liquid crystal gap) can be suppressed by increasing the liquid crystal gap d.

As a result, when a voltage is applied to the transparent comb-teeth 30 electrodes 10, although the lateral electric fields above the electrodes are small, the liquid crystals above the electrodes becomes easier to rotate, and thus the light transmissivity above the comb-teeth electrodes can be improved. In addition, the increase of the liquid crystal retardation above the electrodes due to the increase of the liquid crystal gap, is able to contribute to the increase of the light transmissivity.

Figure 2:
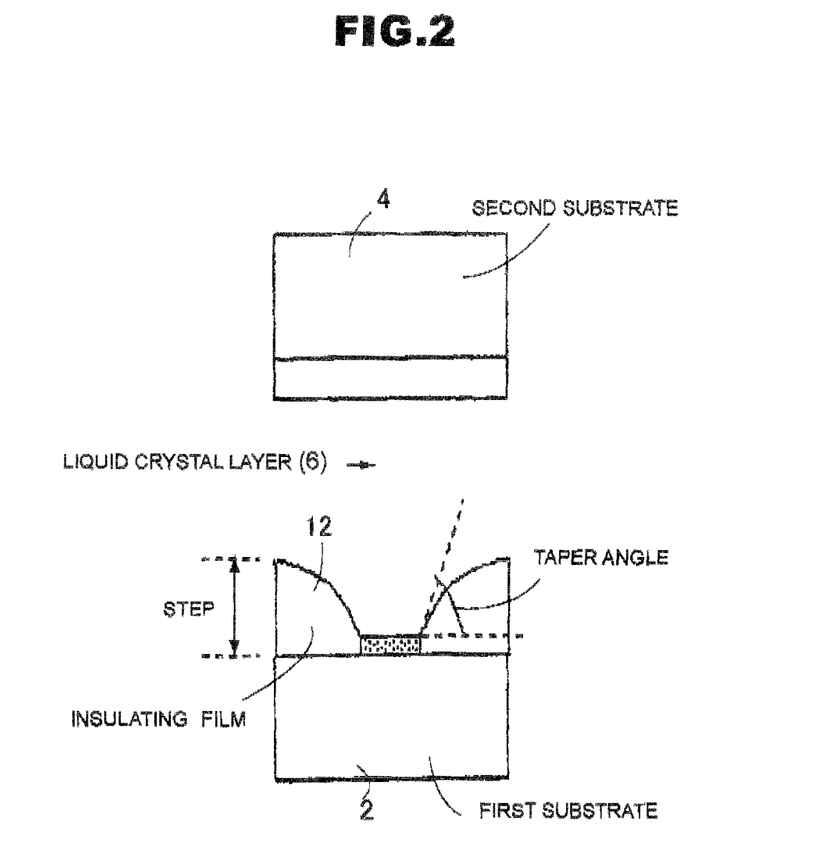
FIG. 2 is a vertical cross section illustrating tile present invention.

One concrete example embodying the present invention will be described. Insulating films (viz., organic films) are patterned on the first substrate in a manner that the liquid crystal gaps above the transparent comb-teeth electrodes 10 become approximately 1.0 μm larger than those between the electrodes. In the instant case, the insulating film is tapered as illustrated in FIG. 2. The taper angle is formed as follows by way of example. That is to say, after the transparent comb-teeth electrodes 10 are formed on the first substrate 2, an organic film is deposited and this deposited film is subject to exposure while locally controlling the amount of the exposure. Alternatively, the taper angles can also be formed by adequately controlling baking temperatures. Organic material is suited to form a thick layer such as more than 1.0 μm as in the above-mentioned example.

Figure 3:
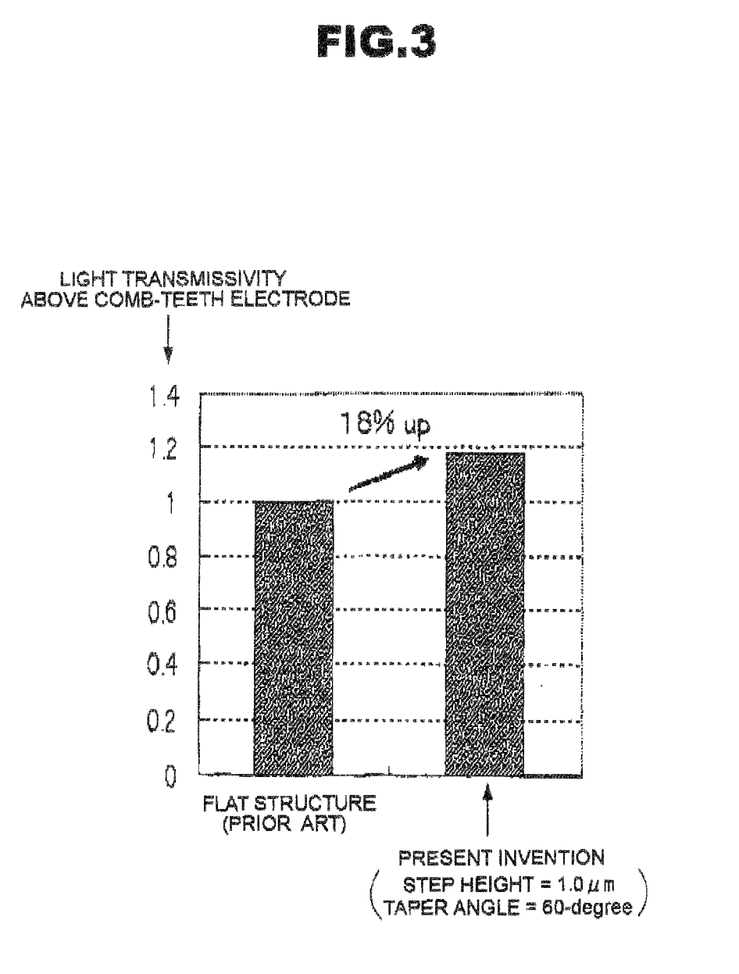
FIG. 3 is a graphic representation showing the effects derived from the present invention.

According to a computer simulation conducted by the inventor, in the case where the height of the step at each of the comb-teeth electrodes was made 1.0 μm and the taper angle of the step was set to 60-degree, the light transmissivity was increased by 18% compared with the case where no step was made as in the prior art, which is schematically shown in FIG. 3. This means that in the case where the pixel pitch is 90 μm by 270 μm, the interval between the adjacent comb-teeth electrodes is 8.5 μm, and the width of each of the comb-teeth is 3.5 μm, the light transmissivity per pixel can be increased by 5%.

Figure 4:
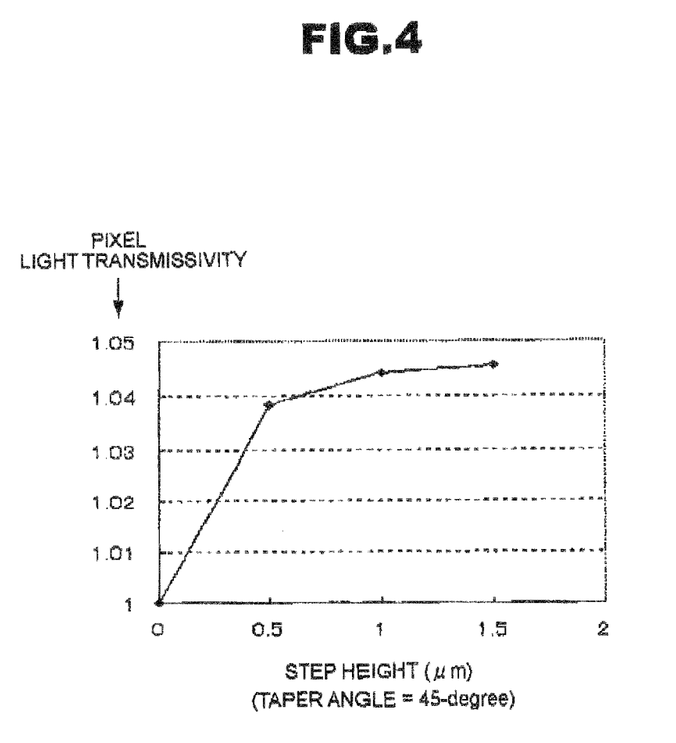
FIG. 4 is a graphic representation showing the effects derived from the present invention.
Figure 5:
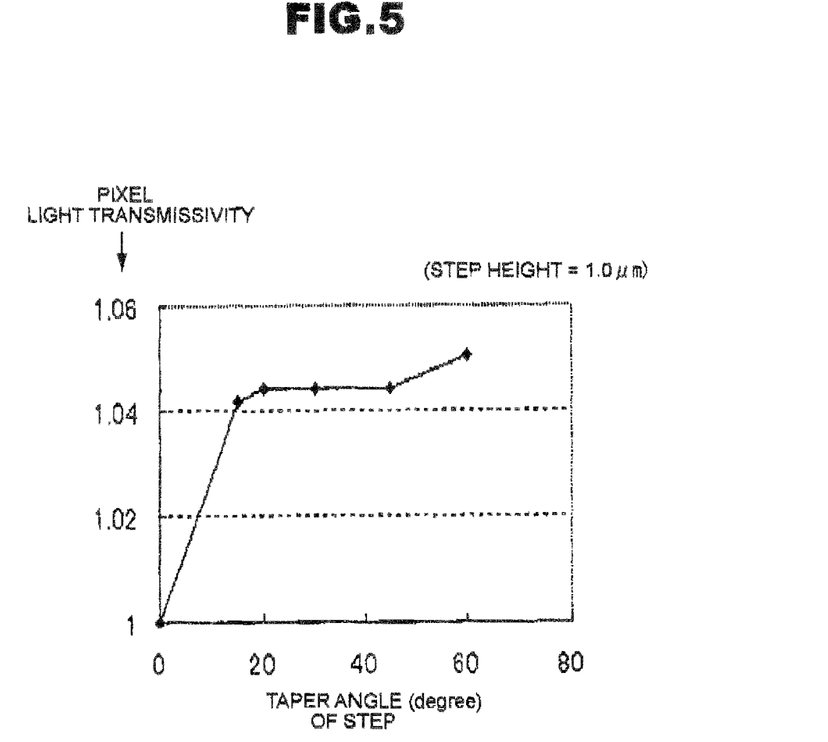
FIG. 5 is a graphic representation showing the effects derived from the present invention.

FIG. 4 is a diagram illustrating a relationship between the insulating film step height and the pixel light transmissivity, and FIG. 5 is a diagram showing a relationship between the taper angle and the pixel light transmissivity. As seen from FIGS. 4 and 5, in view of the practical convenience when the liquid crystals are orientated by rubbing, it is preferable that the step of the insulating film is set to the range between 1.0 μm and 1.5 μm, and the taper angle of the step s made to an angle larger than 45 degrees.

Figure 6:
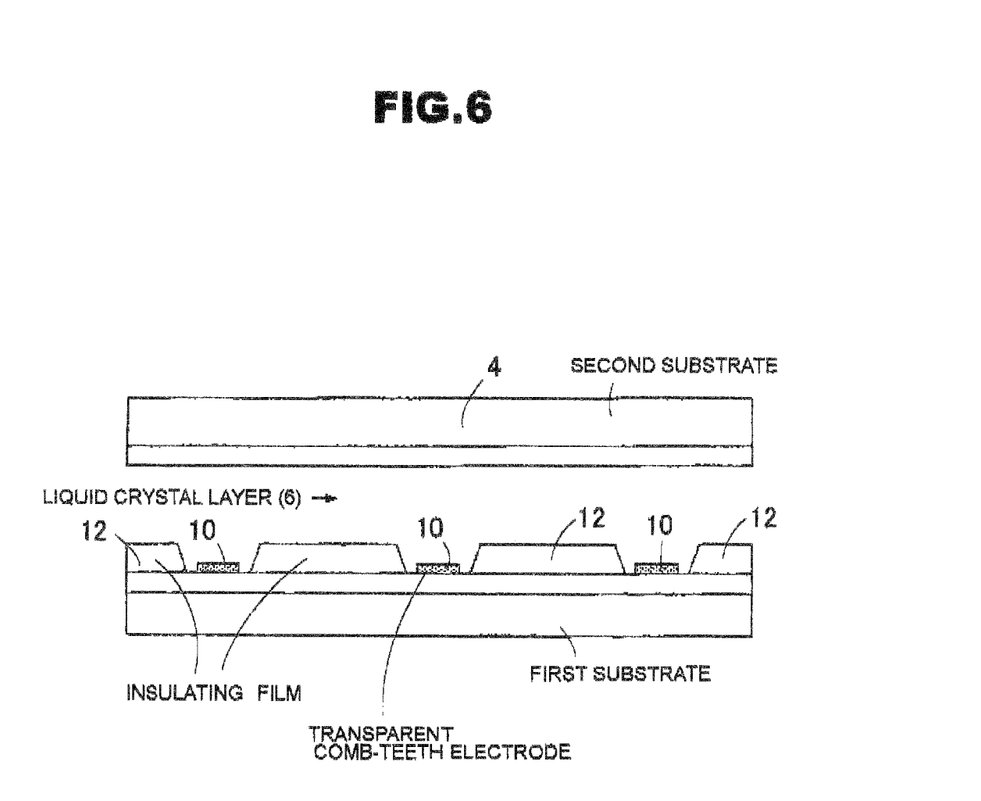
FIG. 6 is a vertical cross section illustrating another embodiment of the present invention.
Figure 7:
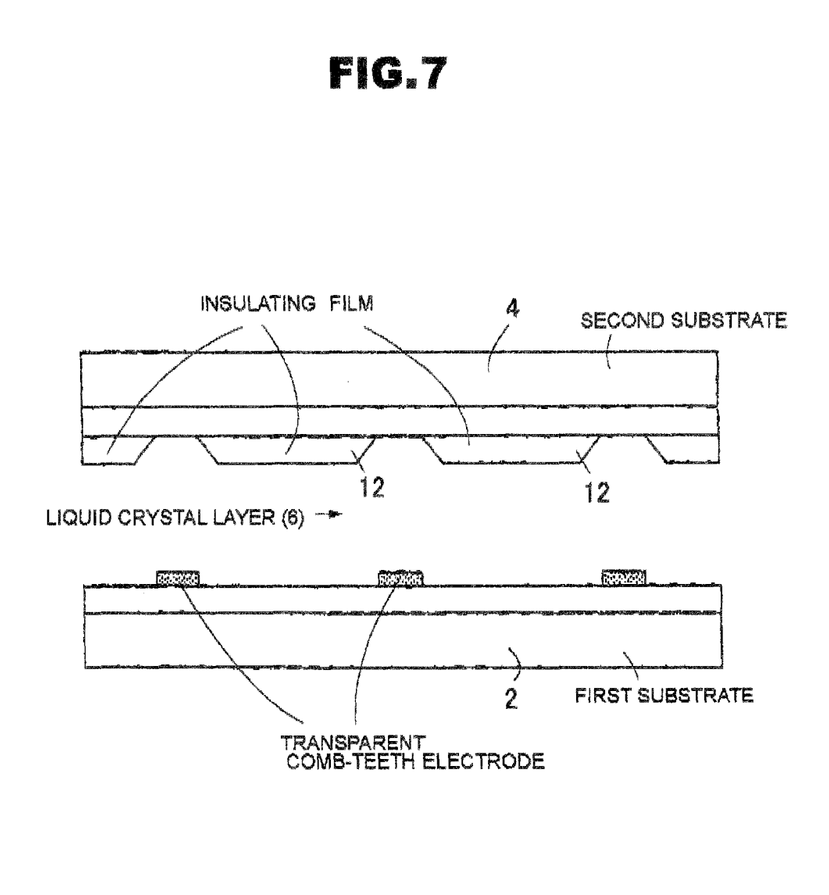
FIG. 7 is a vertical cross section illustrating still another embodiment of the present invention.
Figure 8:
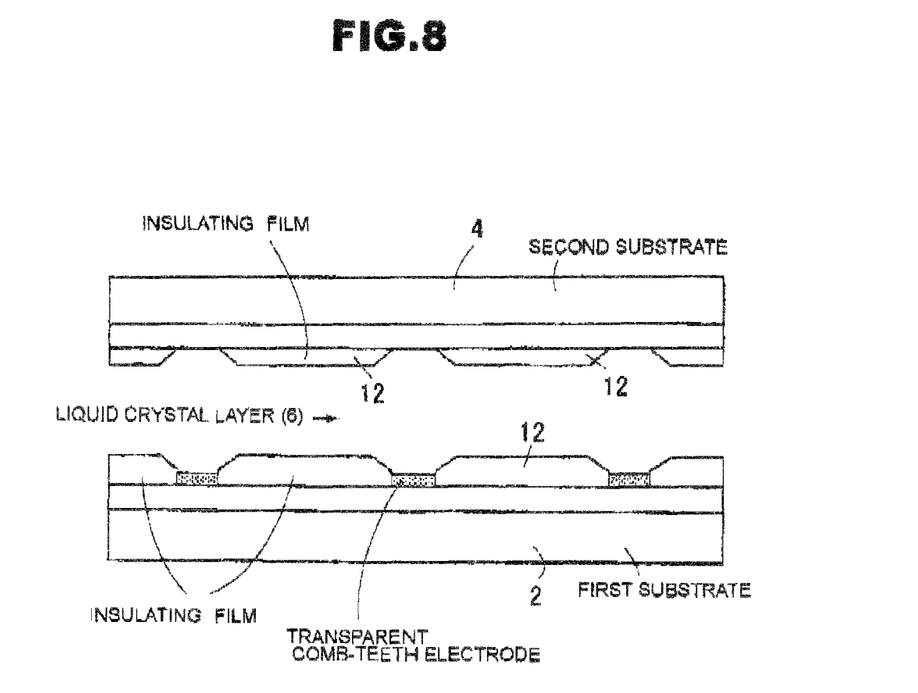
FIG. 8 is a vertical cross section illustrating still another embodiment of the present invention.

In order to avoid an undesirable overlapping of the comb-teeth electrodes 10 and the insulating films 12, the insulating films 12 may be formed such as to be away from the ends of the electrodes 10 as shown in FIG. 6. Furthermore, as shown in FIGS. 7 and 8, the insulating films 12 may be provided on the second substrate 4 or on the both of the first substrate 2 and the second substrate 4.

What is claimed is:

1. An in-plane switching mode active matrix liquid crystal display unit comprising:
   a first substrate including a plurality of scan lines, a plurality of common lines parallel with the scan lines, a plurality of data lines that cross the scan lines, and active elements near the cross portions of the data lines and the scan lines;
   a second substrate parallel with the first substrate;
   a liquid crystal layer between the first and second substrates;
   a plurality of transparent comb-teeth electrodes on the first substrate for applying electric fields to the liquid crystal layer; and
   first insulating patterns on the first substrate, the first insulating patterns being spaced from ends of each of said electrodes,
   wherein liquid crystal gaps above the transparent comb-teeth electrodes are approximately 1.0 μm to 1.5 μm larger than liquid crystal gaps between the transparent comb-teeth electrodes.

2. The in-plane switching mode active matrix liquid crystal display unit as claimed in claim 1, wherein the first insulating patterns form first steps between the transparent comb-teeth electrodes so as to make the liquid crystal gaps above the transparent comb-teeth electrodes approximately 1.0 μm to 1.5 μm larger than the liquid crystal gaps between the transparent comb-teeth electrodes.

3. The in-plane switching mode active matrix liquid crystal display unit as claimed in claim 2, further comprising second insulating patterns on the second substrate that form second steps between the electrodes so as to make the liquid crystal gaps above the transparent comb-teeth electrodes approximately 1.0 μm to 1.5 μm larger than the liquid crystal gaps between the transparent comb-teeth electrodes.

4. The in-plane switching mode active matrix liquid crystal display unit as claimed in claim 3, wherein each of the first and second steps is provided with a taper angle.

5. The in-plane switching mode active matrix liquid crystal display unit as claimed in claim 4, wherein the taper angle is larger than 45 degrees.

6. The in-plane switching mode active matrix liquid crystal display unit as claimed in claim 3, wherein the first and second steps are formed using an organic film.

7. The in-plane switching mode active matrix liquid crystal display unit as claimed in claim 2, wherein each of the first steps is provided with a taper angle.

8. The in-plane switching mode active matrix liquid crystal display unit as claimed in claim 7, wherein the taper angle is larger than 45 degrees.

9. The in-plane switching mode active matrix liquid crystal display unit as claimed in claim 2, wherein the first steps are formed using an organic film.

10. The in-plane switching mode active matrix liquid crystal display unit as claimed in claim 1, further comprising second insulating patterns on the second substrate that form second steps between the electrodes so as to make the liquid crystal gaps above the transparent comb-teeth electrodes approximately 1.0 μm to 1.5 μm larger than the liquid crystal gaps between the transparent comb-teeth electrodes.

11. The in-plane switching mode active matrix liquid crystal display unit as claimed in claim 10, wherein each of the second steps is provided with a taper angle.

12. The in-plane switching mode active matrix liquid crystal display unit as claimed in claim 11, wherein the taper angle is larger than 5 degrees.

13. The in-plane switching mode active matrix liquid crystal display unit as claimed in claim 10, wherein the second steps are formed using an organic film.

* * * * *